W. A. NIVER.
Sled.
No. 67,570.                                      Patented Aug 6, 1867.
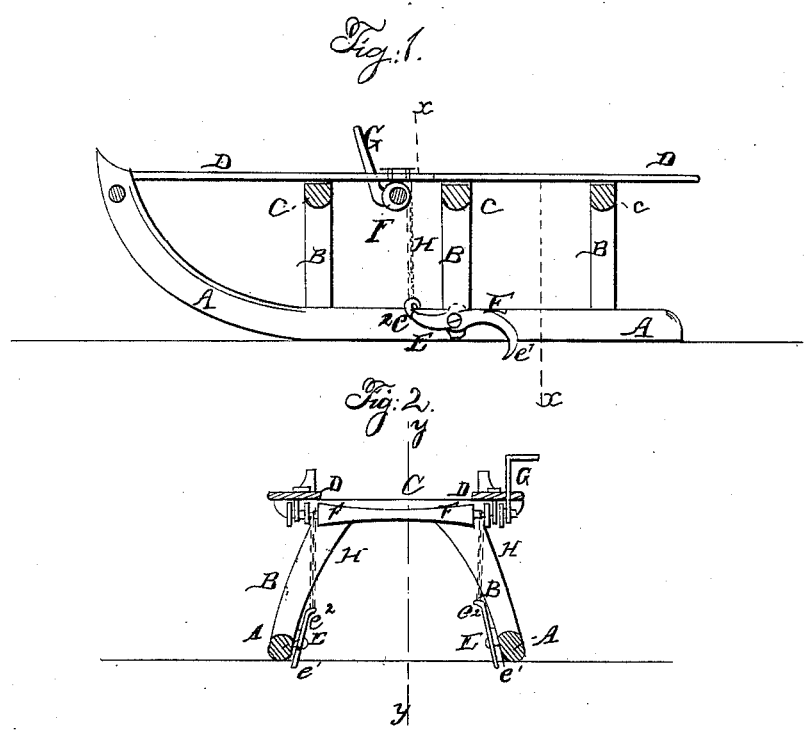

United States Patent Office.

W. A. NIVER, OF SCOTT, NEW YORK.

Letters Patent No. 67,570, dated August 6, 1867.

IMPROVEMENT IN SLEIGH-BRAKE.

The Schedule referred to in these Letters Patent and making part of the same.

TO ALL WHOM IT MAY CONCERN:

Be it known that I, W. A. NIVER, of Scott, in the county of Cortland, and State of New York, have invented a new and improved Sleigh-Brake; and I do hereby declare that the following is a full, clear, and exact description thereof, which will enable others skilled in the art to make and use the same, reference being had to the accompanying drawings, forming part of this specification, in which—

Figure 1 is a vertical longitudinal section of a sleigh having my improved brake attached, taken through the line $y\,y$, fig. 2.

Figure 2 is a cross-section of the same, taken through the line $x\,x$, fig. 1.

Similar letters of reference indicate like parts.

My invention has for its object to furnish an improved brake for sleighs, which shall be cheap, simple, durable, and strong, which can be attached to any sleigh, which, when attached, will be entirely out of the way, and which may be used either to retard the sleigh in going down hill or to hold it in going up hill, so that the horses may have an opportunity to rest; and it consists in an improved brake formed by the combination of the lever-dog, chain, roller, and lever with each other, as hereinafter more fully described.

A are the runners, B the knees, C the beams, and D the raves of the sleigh, about the construction of which parts there is nothing new. E is the dog, which is made in about the shape shown in fig. 1; that is to say, its rear end $e^1$ is curved downward, so as to form a prong or claw to take hold of the snow or roadway. The forward end $e^2$ of the dog may be made straight or in about the shape shown in fig. 1, and should be a little heavier than the rear part, so that when left free it may slightly overbalance it. The dog E is pivoted to the middle part of the runner A, through or near the lower end of the central knee B. F is a roller, extending across the sleigh, and pivoted to the under side of the raves D, as shown in figs. 1 and 2. To this roller is attached the upper end of the chain H, the lower end of which is attached to the forward end of the dog E, as shown in fig. 1. To one end of the roller F is firmly attached a lever, G, extending up through a slot in the rave D, as shown in fig. 2. This lever I prefer to make of such a length that it can be conveniently operated by the driver's foot. The lever G, chain H, and roller F are so arranged that when the lever is in the position shown in the drawings, the chain H will be wound partly around the roller F, so as to raise the forward end of the dog E, and force the rear end down into the snow, and when the lever G is drawn back so as to lie along the upper side of the rave D, the chain H will be unwound from the roller F, so as to allow the forward end of the dog to drop, raising its rear end. The chain H must be of such a length that it will not allow the forward end of the dog E to drop so far as to come in contact with the roadway. A dog, E, and chain H may be attached to each runner and to each end of the roller F, or only one dog and chain may be used, as may be desired or necessary.

I claim as new, and desire to secure by Letters Patent—

An improved brake for sleighs formed by the combination of the lever-dog E, chain H, roller F, and lever G, with each other, substantially as herein shown and described, and for the purpose set forth.

W. A. NIVER.

Witnesses:
 PHINEAS HUTCHINS, Jr.,
 J. HERM. BABCOCK.